US012651360B2

(12) United States Patent
Tu et al.

(10) Patent No.: US 12,651,360 B2
(45) Date of Patent: Jun. 9, 2026

(54) MONOCULAR DEPTH ESTIMATION SYSTEM

(71) Applicant: Black Sesame Technologies Inc., San Jose, CA (US)

(72) Inventors: Wenwen Tu, San Jose, CA (US); Zuoguan Wang, Los Gatos, CA (US); Qun Gu, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 170 days.

(21) Appl. No.: 18/142,445

(22) Filed: May 2, 2023

(65) Prior Publication Data
US 2024/0371014 A1    Nov. 7, 2024

(51) Int. Cl.
*G06T 7/50* (2017.01)

(52) U.S. Cl.
CPC ...... *G06T 7/50* (2017.01); *G06T 2207/10028* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 11,144,818 | B2 * | 10/2021 | Ambrus | G06T 7/70 |
| 2019/0356905 | A1 * | 11/2019 | Godard | G06T 7/73 |
| 2020/0084427 | A1 * | 3/2020 | Sun | G06N 3/045 |
| 2020/0193623 | A1 * | 6/2020 | Liu | G06N 3/04 |
| 2021/0019892 | A1 * | 1/2021 | Zhou | G06V 40/162 |
| 2021/0150227 | A1 * | 5/2021 | Hu | G06V 20/64 |
| 2021/0181757 | A1 * | 6/2021 | Goel | G06T 7/579 |
| 2022/0156525 | A1 * | 5/2022 | Guizilini | G06N 3/084 |
| 2022/0215568 | A1 * | 7/2022 | Dekel | G06T 7/246 |
| 2022/0245843 | A1 * | 8/2022 | Guizilini | G06T 7/246 |
| 2023/0394843 | A1 * | 12/2023 | Lee | G06V 10/44 |

FOREIGN PATENT DOCUMENTS

| | | | | | |
|---|---|---|---|---|---|
| CN | 114170286 | B | * | 4/2023 | |
| JP | 7110502 | B2 | * | 8/2022 | G06K 9/00228 |
| WO | WO-2023165093 | A1 | * | 9/2023 | G06N 20/00 |

OTHER PUBLICATIONS

Lei et al. "Attention based multilayer feature fusion convolutional neural network for unsupervised monocular depth estimation" (Year: 2020).*
Li et al. "Self-supervised coarse-to-fine monocular depth estimation using a lightweight attention module" (Year: 2022).*

(Continued)

*Primary Examiner* — Mohammed Jebari
(74) *Attorney, Agent, or Firm* — Timothy T. Wang; Panorama IP Group PLLC

(57) ABSTRACT

Systems and methods are directed to monocular depth estimation. A method includes capturing an image; encoding the image to form an encoded image; masking one or more dynamic objects in the encoded image; predicting a final prediction performance based on one or more unmasked static objects from the encoded image; decoding and projecting the final prediction performance; and producing an information based on Global Positioning System (GPS), Inertial Measurement Unit (IMU), and wheel encoder fusion.

11 Claims, 6 Drawing Sheets

(56) References Cited

OTHER PUBLICATIONS

Wang et al. "Self-supervised monocular depth estimation with direct methods" (Year: 2020).*

"Unsupervised depth estimation from monocular videos with hybrid geometric-refined loss and contextual attention".*

Dai et al. "Unsupervised learning of depth estimation based on attention model and global pose optimization" (Year: 2019).*

Godard, C., Mac Aodha, O., Firman, M., & Brostow, G. J. "Digging into self-supervised monocular depth estimation". In Proceedings of the IEEE/CVF International Conference on Computer Vision: pp. 3828-3838, 2019.

Zhou, T., Brown, M., Snavely, N., & Lowe, D. G. "Unsupervised learning of depth and ego-motion from video". In Proceedings of the IEEE conference on computer vision and pattern recognition: pp. 1851-1858, 2017.

Guizilini, V., Hou, R., Li, J., Ambrus, R., & Gaidon, A. "Semantically-guided representation learning for self-supervised monocular depth". arXiv preprint arXiv:2002.12319. 2020.

Klingner, M., Termohlen, J. A., Mikolajczyk, J., & Fingscheidt, T. "Self-supervised monocular depth estimation: Solving the dynamic object problem by semantic guidance". In European Conference on Computer Vision: pp. 582-600. 2020.

Kuznietsov, Y., Stuckler, J., & Leibe, B. "Semi-supervised deep learning for monocular depth map prediction". In Proceedings of the IEEE conference on computer vision and pattern recognition: pp. 6647-6655. 2017.

Amiri, A. J., Loo, S. Y., & Zhang, H. "Semi-supervised monocular depth estimation with left-right consistency using deep neural network". In 2019 IEEE International Conference on Robotics and Biomimetics (ROBIO): pp. 602-607. 2019.

Guizilini, V., Li, J., Ambrus, R., Pillai, S., & Gaidon, A. "Robust semi-supervised monocular depth estimation with reprojected distances". In Conference on robot learning: pp. 503-512. 2020.

Johnston, A., & Carneiro, G. "Self-supervised monocular trained depth estimation using self-attention and discrete disparity volume". In Proceedings of the IEEE/cvf conference on computer vision and pattern recognition: pp. 4756-4765. 2020.

Chen, Y., Zhao, H., Hu, Z., & Peng, J. Attention-based context aggregation network for monocular depth estimation. International Journal of Machine Learning and Cybernetics: vol. 12, No. 6, pp. 1583-1596. 2021.

Lowe, D. G. "Distinctive image features from scale-invariant keypoints". International journal of computer vision: vol. 60, No. 2, pp. 91-110. 2004.

Casser, V., Pirk, S., Mahjourian, R., & Angelova, A. "Unsupervised learning of depth and ego-motion: A structured approach". In Thirty-Third AAAI Conference on Artificial Intelligence (AAAI-19): vol. 2, p. 7. 2019.

Garg, R., Bg, V. K., Carneiro, G., & Reid, I. "Unsupervised cnn for single view depth estimation: Geometry to the rescue". In European conference on computer vision: pp. 740-756. 2016.

Godard, C., Mac Aodha, O., & Brostow, G. J. "Unsupervised monocular depth estimation with left-right consistency". In Proceedings of the IEEE conference on computer vision and pattern recognition: pp. 270-279. 2017.

Brunet, D., Vrscay, E. R., & Wang, Z. "On the mathematical properties of the structural similarity index". IEEE Transactions on Image Processing: vol. 21, No. 4, pp. 1488-1499. 2011.

Wagstaff, B., & Kelly, J. "Self-supervised scale recovery for monocular depth and egomotion estimation". arXiv preprint arXiv:2009.03787, 2020.

Bian, J., Li, Z., Wang, N., Zhan, H., Shen, C., Cheng, M. M., & Reid, I. "Unsupervised scale-consistent depth and ego-motion learning from monocular video". Advances in neural information processing systems: pp. 35-45. 2019.

* cited by examiner

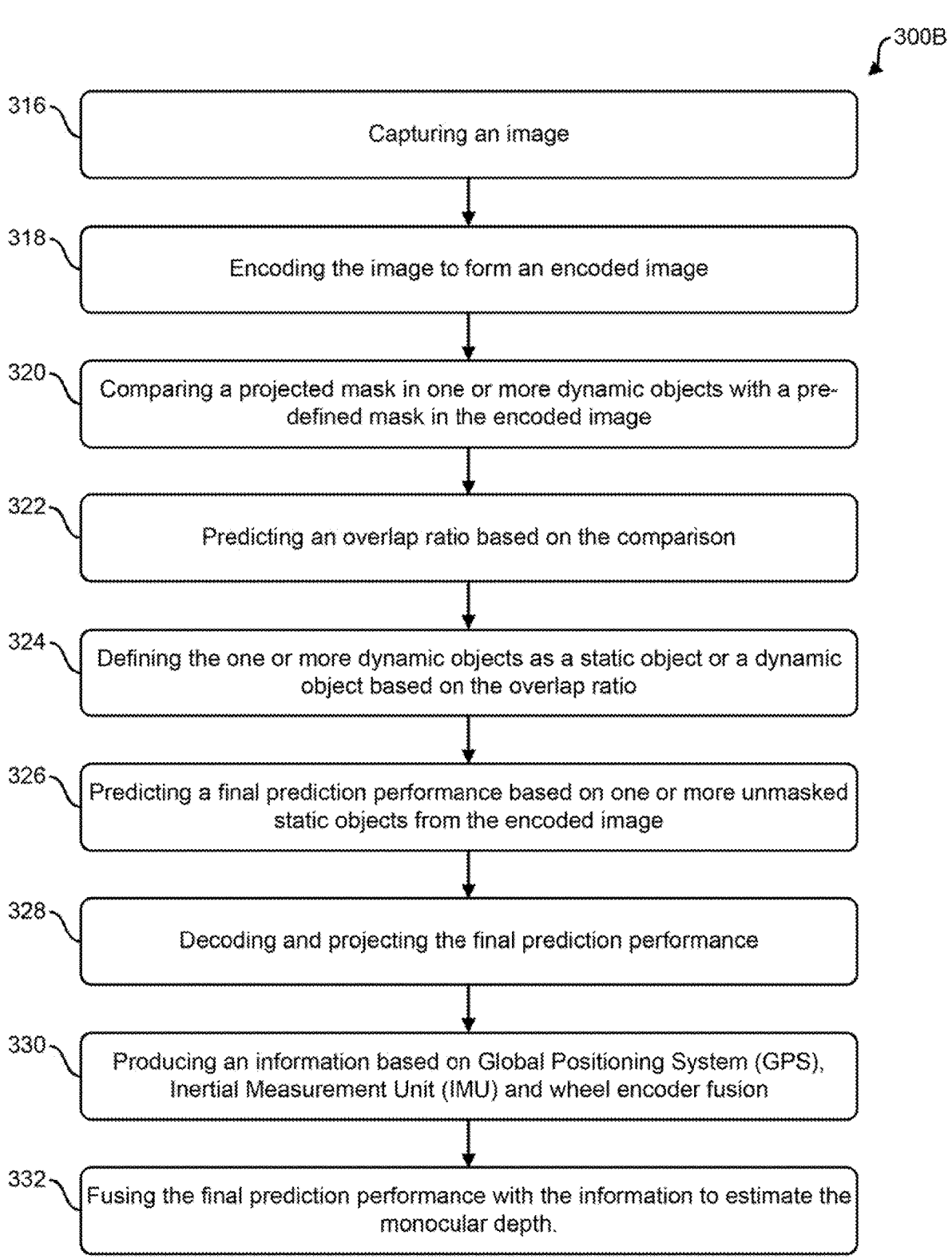

316 — Capturing an image

318 — Encoding the image to form an encoded image

320 — Comparing a projected mask in one or more dynamic objects with a pre-defined mask in the encoded image 322 — Predicting an overlap ratio based on the comparison 324 — Defining the one or more dynamic objects as a static object or a dynamic object based on the overlap ratio 326 — Predicting a final prediction performance based on one or more unmasked static objects from the encoded image 328 — Decoding and projecting the final prediction performance 330 — Producing an information based on Global Positioning System (GPS), Inertial Measurement Unit (IMU) and wheel encoder fusion 332 — Fusing the final prediction performance with the information to estimate the monocular depth.

FIG. 3B

MONOCULAR DEPTH ESTIMATION SYSTEM

FIELD OF INVENTION

The present invention discloses a system for monocular depth estimation with a self-attention mechanism. More specifically, the invention discloses a system or a method to solve the scale ambiguity issue as well as improving depth estimation performance via introducing kinematics along with a self-attention module.

BACKGROUND

Depth estimation is a fundamental components of a 3D understanding of surroundings in the field computer vision, which is a basic model in any autonomous driving system. Traditional approaches to estimate depth in images depends on identifying the same points in no less than two images and then to calculate the corresponding depth based on camera model and relative poses of images. Recently, due to the development of deep learning, learning depth attracts more and more attention.

Garg et al. first introduced joint learning of depth and ego motion. Then Zhou et al. further provided a differentiable approach to jointly learn depth and ego motion using deep learning techniques. Since then, many more works have attempted to improve the depth estimation performance following the paradigm of jointly learn depth and ego motion.

The network of joint learning of depth and ego motion typically consists of two nets, one is to estimate depth (depth net) and the other one is to estimate relative pose (pose net). In general, the input to the depth net is a single image, while the input to the pose net is two sequential images. During training, we can project one image to the other image based on the estimated depth and relative pose. Then we can construct loss function based on the photometric difference between the projected image and the real image, along with some other constraints like SSIM.

"Unsupervised Learning of Depth and Ego-Motion from Video" by Tinghui Zhou represents an unsupervised learning framework for the task of monocular depth and camera motion estimation from unstructured video sequences. We achieve this by simultaneously training depth and camera pose estimation networks using the task of view synthesis as the supervisory signal.

"Semi-Supervised Deep Learning for Monocular Depth Map Prediction" by Yevhen Kuznietsov represents a supervised deep learning that often suffers from the lack of sufficient training data. Specifically in the context of monocular depth map prediction, it is barely possible to determine dense ground truth depth images in realistic dynamic outdoor environments.

However, the above joint learning method inherently has the following limitations: 1) scale ambiguity; and 2) dynamic object issue. The scale ambiguity issue is due to the camera property that a near and small object can be the same in an image as that of a far and large object. Moreover, it's impossible to recover the scale merely based on images. The dynamic object issue is due to the fact that it assumes that the captured scene is static so that one image is projected to the other one, while the dynamic object obviously violates this assumption.

Therefore, to overcome the shortcomings of the prior art, there is a need to develop a system for monocular depth estimation to solve the scale ambiguity issue as well as improving depth estimation performance via introducing kinematics along with self-attention module.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need to provide an automated cropping system that uses model based approaches without customization for significant information.

SUMMARY

Depth estimation is an important active research direction in the field of computer vision. Typically, monocular depth estimation consists of three paradigms, i.e., supervised method, semi-supervised method, and self-supervised method. Due to the difficulty of obtaining dense ground-truth data, researchers increasingly focus on both self-supervised depth estimation and semi-supervised depth estimation.

The self-supervised method attracts attention as it requires no ground-truth data which is expensive to obtain. Also, it only relies in sequential images which are continuously captured by video camera. However, it has inherent disadvantage, i.e., scale ambiguity, as a large far-away object can look the same in camera as that of a small nearby object.

Thus, many researchers have sought for novel methods to recover the estimated depth scale, e.g., with a height known camera, lidar points etc., among which semi-supervised method is the most promising one.

Compared with a supervised method and self-supervised method, a semi-supervised method is a compromised version: it only additionally requires sparse depth points in images. The sparse depth points can be obtained by Lidar scans. The main idea of semi-supervision follows that of self-supervision, and it additionally compares the estimated depth values with the sparse ground-truth data at those points that coincide with lidar points, via which people hope the sparse ground-truth data can drive the whole estimation scale to the real physical world units.

It is a common in both self-supervised and semi-supervised methods to use additional pose net in the training phase to provide relative pose information to construct loss function. But the precision of pose net heavily affects the final performance of depth information. This disclosure provides a new solution to improve the depth estimation performance by introducing kinematic information and a self-attention mechanism.

The primary objective of the present invention is to provide a system for monocular depth estimation. The system comprises a self-attention module, a kinematic module, and a processor. The self-attention module comprises an encoder, an attention unit, and a decoder. The encoder receives a captured image from a camera to form an encoded image. The attention unit increases a reception area of the encoded image to form a final prediction performance; and the decoder for decoding and projecting a final prediction performance.

Moreover, the kinematic module comprises one or more information obtained from fusion of GPS, IMU, and wheel encoder fusion. The processor improves the final prediction performance by fusing the information and estimating the monocular depth accurately.

Another objective of the present invention is to provide a system which comprises segmentation net to output a mask of one or more dynamic objects and to other images. Another objective of the present invention is to provide the segmentation net to compare an overlap of projected mask in the one or more dynamic objects and detected mask in the other image. Another objective of the present invention is to provide a loss function is constructed to improve the final prediction performance. The loss function comprises a re-projection loss, a smoothness loss, and a geometry consistency loss. Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 3B illustrates a method for estimating a monocular depth by fusing kinematic information depth in accordance with the present invention.

DETAILED DESCRIPTION

The present invention proposes the utilization of kinematic information and a self-attention module to improve depth estimation accuracy. Kinematic information can be easily obtained from the fusion of GPS, IMU, and Wheel encoder.

The invention discloses a new solution of training depth estimation net to improve prediction performance, using kinematics and a self-attention module. The invention not only helps to recover depth scale, but also simplifies the training stage and solves the dynamic object issue.

Figure 1:
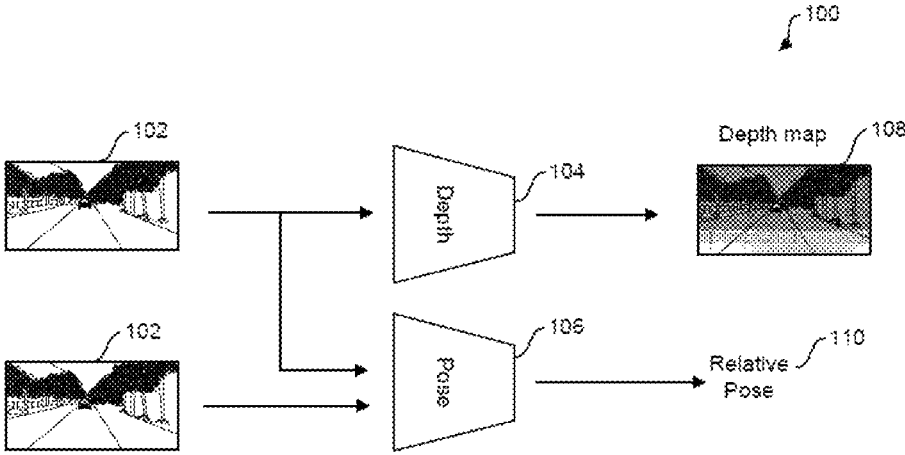
FIG. 1 illustrates a prior art depicting joint learning of depth and pose.

FIG. 1 illustrates a prior art 100 depicting joint learning of depth and pose. The network of joint learning of depth and ego-motion typically consists of two nets: one is to estimate depth (depth net) 104 and the other one is to estimate relative pose (pose net) 106. In general, the input to the depth net is a single image 102, while the input to the pose net is two sequential images.

During training, one image is projected to the other image based on the depth map 108 and relative pose 110. Then loss function is constructed based on the photometric difference between the projected image and the real image, along with some other constraints like SSIM.

Removing pose net significantly simplifies the learning process. Otherwise, the depth net performance may compromise as it heavily relies on the pose net prediction accuracy, thus replacing it with kinematics.

In addition, as the kinematic information is consistent with the physical world, it will help in resolve the scale ambiguity issue. Self-attention module helps in increasing reception area which improves learning process in return.

Figure 2A:
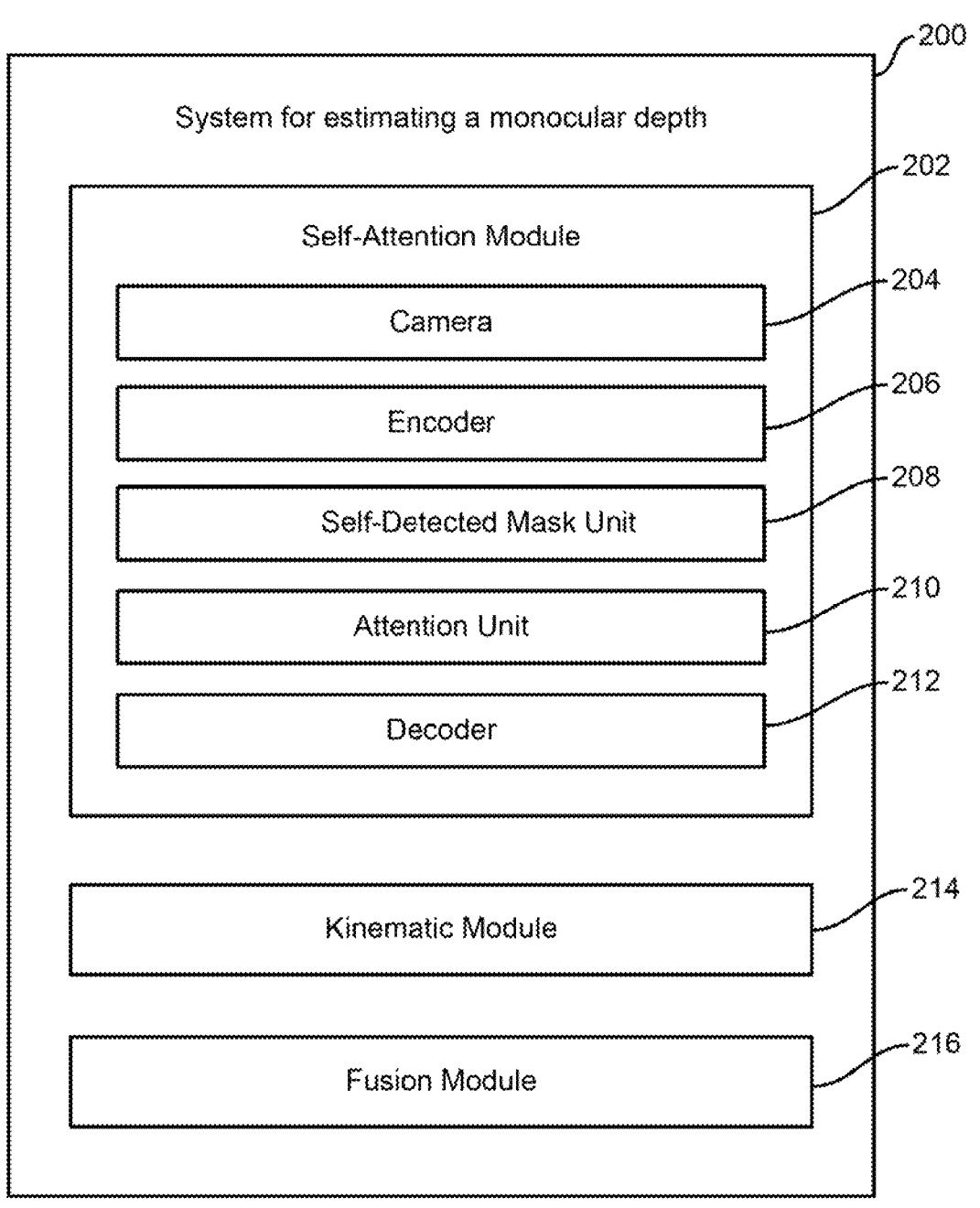
FIG. 2A illustrates a system estimating a monocular depth in accordance with the present invention.

FIG. 2A illustrates a system estimating a monocular depth. The system 200 comprises a self-attention module 202, a kinematic module 214, and a fusion module 216. The self-attention module 202 comprises a camera 204, an encoder 206, a self-detected mask unit 208, an attention unit 210, and a decoder 212. The encoder 206 receives a captured image from a camera 204 and forming an encoded image.

The self-detected mask unit 208 constructs a self-detected mask by comparing an estimated depth D1 and a projected depth map. This mask is to weight the second term of re-projection loss. As all dynamic objects are not masked out. Otherwise, the accuracy for those objects compromise as these objects never participate in training. These objects are needed when they are static in sequential images, and masked if they are moving. Thus, a learning based method is designed to construct such a mask. The projected mask i.e. the self-detected mask in the one or more dynamic objects is compared with a pre-defined mask in the encoded image to predict an overlap ratio.

In an alternative embodiment, the system includes a segmentation unit to compare a projected mask in the one or more dynamic objects with a pre-defined mask in the encoded image to predict an overlap ratio. The overlap ratio is able to define the one or more dynamic objects as a static object or a dynamic object and mask the dynamic in the encoded image. Moreover, the segmentation net compare an overlap of projected mask in the one or more dynamic objects and detected mask in the other image.

The overlap is less than a defined ratio, the one or more dynamic objects is considered as moving, otherwise static. The one or more dynamic objects is masked out from a final loss function when the object is moving or they will be counted.

The attention unit 210 increases a reception area of the encoded image and a final prediction performance is predicted based on one or more unmasked static objects from the encoded image. The decoder decodes and projects a final prediction performance. Moreover, the kinematic module 214 comprises information obtained from fusion of GPS, IMU, and wheel encoder fusion. The fusion module 216 improves the final prediction performance by fusing the one or more information and estimating the monocular depth accurately.

A loss function is constructed to improve the final prediction performance. The loss function comprises a re-projection loss, a smoothness loss and a geometry consistency loss. The re-projection loss is a summation of photometric loss and structural similarity (SSIM) difference. The smoothness loss is introduced to enhance nearby positions to have similar depth values. The geometry consistency loss comprises one or more re-projection weights.

The segmentation net output a mask of dynamic objects, and they project the mask to other images, and they compare the overlap of projected mask and detected mask in the other image. If the overlap is less than a given ratio, they take the dynamic objects as moving, otherwise those objects are static. And those pixels on dynamic objects will be masked out from the final loss function, if they are moving, otherwise they will be counted, in which it improves the learning performance, especially for the dynamic objects.

Even with the significant progress, the depth estimation performance heavily relies on accuracy of pose net, while pose estimation itself is difficult to learn. As the inference of depth does not need the pose information, we propose to simplify the learning progress by removing pose net. The kinematic information is used as a substitute. In addition, to better capture the relationship of surrounding pixels, the invention proposes to use a self-attention net after context aggregation, which will further improve the estimation performance.

Figure 2B:
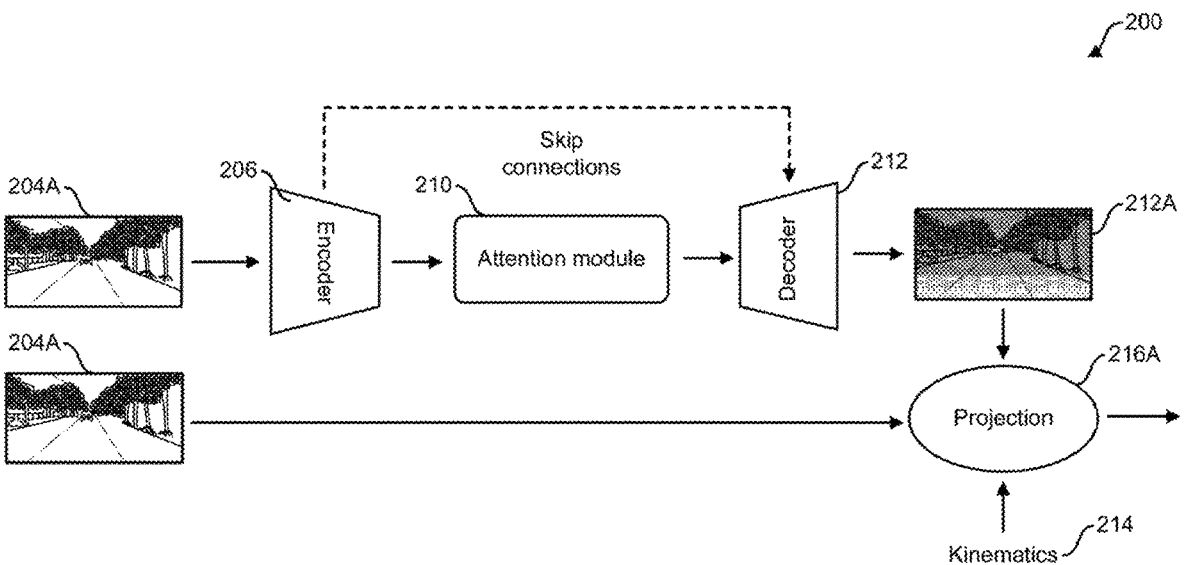
FIG. 2B illustrates a framework of the system for estimating a monocular depth in accordance with the present invention.

FIG. 2B illustrates a framework of the system for estimating a monocular depth. The disclosure proposes to utilize kinematic information and self-attention module to improve depth estimation accuracy. Kinematic information 214 can be easily obtained from the fusion of GPS, IMU, and Wheel encoder fusion.

The overview proposed framework is illustrated in FIG. 2. Resnet-18 is used as the backbone encoder 206. After extracting features, we use an attention unit 210 to increase the reception area which helps in improve final prediction performance 212A and projecting 216A the estimated depth of the encoded image.

Given two sequential images 204A ($I_1$, $I_2$) and relative pose T, we first use the depth net twice to predict their depth maps ($D_1$, $D_2$), then we will obtain a synthesized image $I_{2 \to 1}$ and depth map $D_{2 \to 1}$ by warping ($I_2$, $D_2$) to ($I_1$, $D_1$) with $D_1$ and T using bilinear interpolation. We construct the loss function as follows:

$$L = M \odot L_p + \alpha L_s + \beta L_g,$$

where M is self-detected mask, $L_p$ is reprojection loss, $L_s$ is smoothness loss, and $L_g$ is geometry consistency loss.

Re-projection loss: It has been a common practice to construct the re-projection loss as the summation of photometric loss and structural similarity (SSIM) difference $$L_p = \frac{\lambda}{2}(1 - SSIM(I_1, I_{2 \to 1})) + (1 - \lambda)|I_1 - I_{2 \to 1}|.$$

Smoothness loss: The smoothness loss is introduced to encourage nearby positions to have similar depth values, and it is constructed as $$L_s = \sum |\partial_x D_1| e^{-|\partial_x I_1|} + |\partial_y D_1| e^{-|\partial_y I_1|}$$

Geometry consistency loss and self-detected mask: To encourage predicted depth to be consistent cross images, we follow [17] to construct the geometry consistency loss by warping $D_2$ to $$L_g = \frac{|D_1 - D_{2 \to 1}|}{D_1 + D_{2 \to 1}}$$

and, we can construct M=1−$L_g$. M also serves as reprojection weights: when the re-projection is perfect, M=1; otherwise, it's close to zero.

Figure 4:
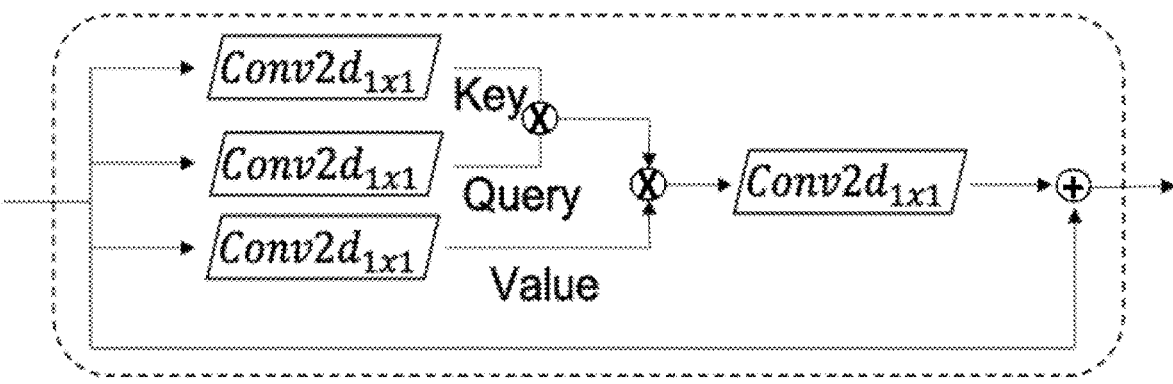
FIG. 4 illustrates a formulation of the loss function, including re-projection loss, smoothness loss, and geometry consistency loss, in accordance with an embodiment of the present invention.

Attention module: The attention module has been proved to improve both object detection and semantic segmentation task in computer vision. It maps a query and a set of key-value pairs to the output, and the query, key and value can be obtained by applying a 1×1 convolutional operation for images. The loss function is defined as illustrated in FIG. 4.

Figure 3A:
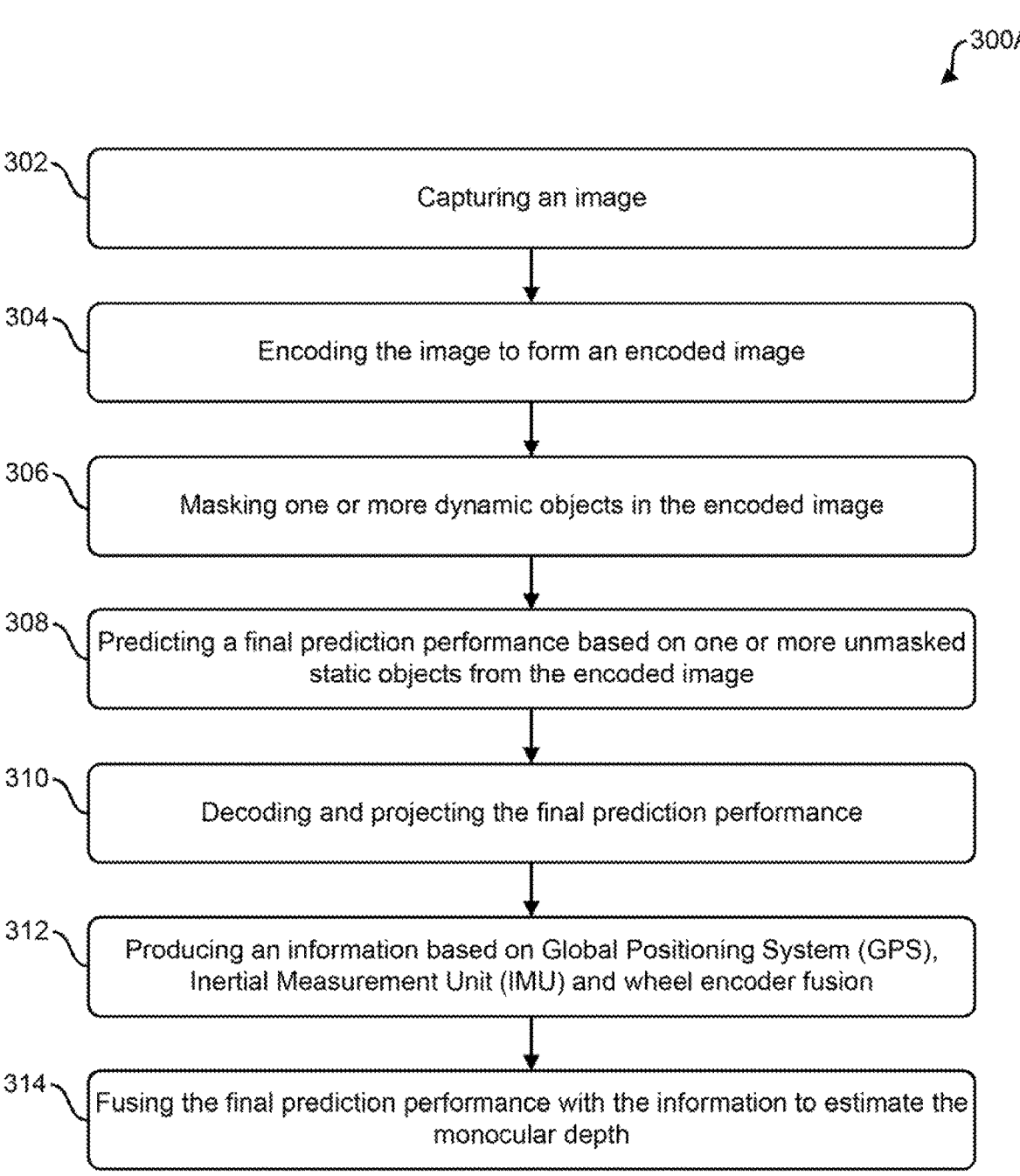
FIG. 3A illustrates a method for estimating a monocular depth in accordance with the present invention.

FIG. 3A illustrates a method for estimating a monocular depth 300A. The method comprises capturing of an image via a camera 302. Then the image encoded by an encoder to form an encoded image 304. The one or more dynamic objects are masked in the encoded image 306.

A final prediction performance is predicted based on one or more unmasked static objects from the encoded image by an attention unit 308. Later, the final prediction performance is decoded and projected via a decoder 310.

Information based on Global Positioning System (GPS), Inertial Measurement Unit (IMU), and wheel encoder fusion is produced in the kinematic module 312. Finally, the final prediction performance is fused with the information to estimate the monocular depth by the fusion module 314.

FIG. 3B illustrates a method for estimating a monocular depth by fusing kinematic information depth 300B. The method comprises capturing of an image via a camera 316. Then the image encoded by an encoder to form an encoded image 318. The one or more dynamic objects are masked in the encoded image 320. The system predicts an overlap ratio based on the comparison by a segmentation unit 322. Then, the one or more dynamic objects are defined as a static object or a dynamic object based on the overlap ratio 324. A final prediction performance is predicted based on one or more unmasked static objects from the encoded image by an attention unit 326. Later, the final prediction performance is decoded and projected via a decoder 328.

Information based on Global Positioning System (GPS), Inertial Measurement Unit (IMU), and wheel encoder fusion is produced in the kinematic module 330. Finally, the final prediction performance is fused with the information to estimate the monocular depth by the fusion module 332.

While, the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for estimating monocular depth, comprising:
capturing an image;
encoding the image to form an encoded image;
comparing a projected mask in one or more dynamic objects with a pre-defined mask in the encoded image to predict an overlap ratio;
updating a pre-defined one or more dynamic objects as a static object or a dynamic object based on the overlap ratio;
masking one or more dynamic objects in the encoded image;
predicting a final prediction performance based on one or more unmasked static objects from the encoded image;
decoding and projecting the final prediction performance;

producing an information based on Global Positioning System (GPS), Inertial Measurement Unit (IMU), and wheel encoder fusion; and
estimating the monocular depth based on the final prediction performance and the information.

2. A method for estimating monocular depth, comprising:
capturing an image;
encoding the image to form an encoded image;
comparing a projected mask in one or more dynamic objects with a pre-defined mask in the encoded image to predict an overlap ratio;
updating a pre-defined one or more dynamic objects to either a static object or a dynamic object based on the overlap ratio;
predicting a final prediction performance based on one or more unmasked static objects from the encoded image; and
decoding and projecting the final prediction performance;
producing an information based on Global Positioning System (GPS), Inertial Measurement Unit (IMU), and wheel encoder fusion; and
estimating the monocular depth based on the final prediction performance and the information.

3. The method of claim 1, wherein masking one or more dynamic objects in the encoded image comprises masking the one or more dynamic objects with a self-detected mask on calculating loss in training.

4. The method of claim 3, wherein the self-detected mask is formed by comparing an estimated depth and a projected depth map.

5. The method of claim 1, wherein the one or more dynamic objects is masked from a final loss function.

6. The method of claim 5, wherein the final loss function is calculated to improve the final prediction performance.

7. The method of claim 6, wherein the final loss function comprises a re-projection loss, a smoothness loss, and a geometry consistency loss.

8. The method of claim 7, wherein the re-projection loss is summation of photometric loss and structural similarity (SSIM) difference.

9. The method of claim 7, wherein the geometry consistency loss comprises one or more re-projection weights.

10. A system for estimating monocular depth, comprising:
a memory and a processor, wherein the memory is connected to the processor;
the memory stores a computer program; and
the processor implements the method of claim 1 when executing the computer program.

11. A system for estimating monocular depth, comprising:
a processor, wherein the memory is connected to the processor;
the memory stores a computer program; and
the processor implements the method of claim 2 when executing the computer program.

* * * * *